US009606361B2

(12) United States Patent
Yang et al.

(10) Patent No.: US 9,606,361 B2
(45) Date of Patent: Mar. 28, 2017

(54) ELECTRONIC EYEGLASS (71) Applicant: Quanta Computer Inc., Tao Yuan Shien (TW)

(72) Inventors: Wen-Chu Yang, New Taipei (TW); Chung-Te Li, New Taipei (TW); Jammy Huang, Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 257 days.

(21) Appl. No.: 14/457,393

(22) Filed: Aug. 12, 2014

(65) Prior Publication Data

US 2015/0323796 A1 Nov. 12, 2015

(30) Foreign Application Priority Data

May 8, 2014 (TW) .............................. 103116384 A (51) Int. Cl.
| G02B 27/01 | (2006.01) |
| G02C 7/12 | (2006.01) |
| G02C 7/10 | (2006.01) |
| G02F 1/133 | (2006.01) |
| G02F 1/1335 | (2006.01) |

(52) U.S. Cl.
CPC ........... *G02B 27/0172* (2013.01); *G02C 7/10* (2013.01); *G02C 7/12* (2013.01); *G02F 1/13306* (2013.01); *G02F 1/133528* (2013.01); *G02B 2027/012* (2013.01); *G02B 2027/0132* (2013.01); *G02B 2027/0178* (2013.01); *G02F 2001/13355* (2013.01)

(58) Field of Classification Search
CPC ................ G02B 27/14; G02B 27/0172; G02B 2027/0178; G02B 2001/13355; G02B 2027/012; G02B 2027/0132; G09G 5/00; G02C 7/12; G02C 7/10; G02F 1/13306; G02F 1/133528
See application file for complete search history.

(56) References Cited

U.S. PATENT DOCUMENTS

| 5,526,184 A * | 6/1996 | Tokuhashi ......... G02B 27/0172 359/489.07 |
| 2011/0213664 A1 | 9/2011 | Osterhout et al. |
| 2012/0235886 A1* | 9/2012 | Border ............... G02B 27/0093 345/8 |
| 2015/0323795 A1* | 11/2015 | Alton ................. G02B 27/0172 349/11 |

FOREIGN PATENT DOCUMENTS

| TW | 200611014 A | 4/2006 |
| TW | 201403115 A | 1/2014 |

OTHER PUBLICATIONS

Taiwanese Office Action dated Aug. 5, 2015.

* cited by examiner

*Primary Examiner* — Lun-Yi Lao
*Assistant Examiner* — Johny Lau
(74) *Attorney, Agent, or Firm* — Rabin & Berdo, P.C.

(57) ABSTRACT

An electronic eyeglass is disclosed. The electronic eyeglass includes a polarizing beam splitter (PBS) and an eyeglass frame. The eyeglass frame carries the PBS.

20 Claims, 8 Drawing Sheets

ELECTRONIC EYEGLASS

This application claims the benefit of Taiwan application Serial No. 103116384, filed May 8, 2014, the subject matter of which is incorporated herein by reference.

BACKGROUND OF THE INVENTION

Field of the Invention

The invention relates in general to an electronic device, and more particularly to an electronic eyeglass.

Description of the Related Art

Current head mounted displays can be divided into two main categories, namely, immersive type head mounted display and see-through type head mounted display. The first type of head mounted display, that is, the immersive type head mounted display, is also referred as non-see-through type head mounted display. The most significant feature of the immersive type head mounted display is that the user is completely isolated from external light, such that the user is completely immersed in an environment provided by the head mounted display. The second type of head mounted display, that is, the see-through type head mounted display, is also referred as optical see-through type head mounted display. The most significant feature of the optical see-through type head mounted display is that the user is not isolated from external light, such that the user can see both the image of an external environment (real image) and the image provided by the head mounted display (virtual image).

SUMMARY OF THE INVENTION

The invention is directed to an electronic eyeglass.

According to one embodiment of the present invention, an electronic eyeglass is disclosed. The electronic eyeglass comprises a polarizing beam splitter (PBS) and an eyeglass frame. The eyeglass frame carries the PBS.

The above and other aspects of the invention will become better understood with regard to the following detailed description of the preferred but non-limiting embodiment (s). The following description is made with reference to the accompanying drawings.

DETAILED DESCRIPTION OF THE INVENTION

The electronic eyeglass disclosed in following embodiments at least comprises a polarizing beam splitter (PBS) and an eyeglass frame. The eyeglass frame carries the PBS. When the polarization direction of a polarized light is identical to the polarization direction of the PBS, the polarized light passes through the PBS. Conversely, when the polarization direction of a polarized light is different from the polarization direction of the PBS, the PBS reflects the polarized light.

First Embodiment

Figure 1:
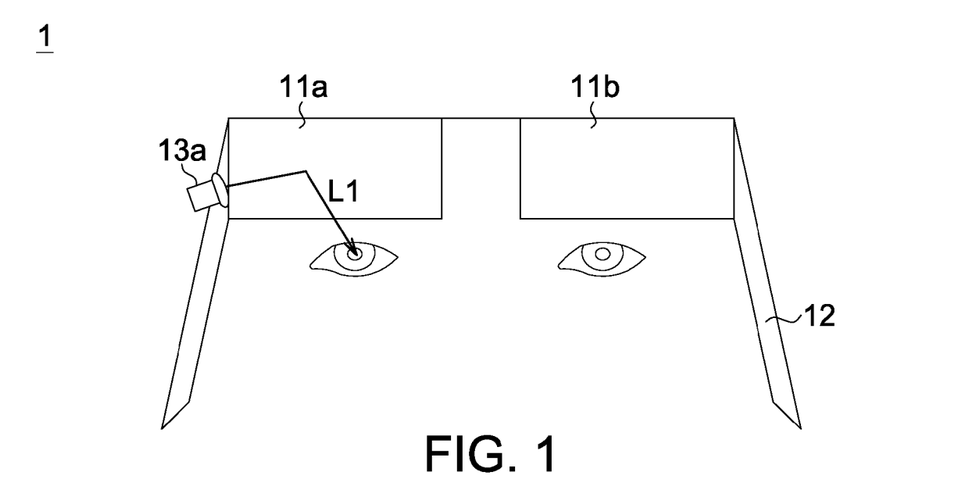
FIG. 1 is an appearance diagram of an electronic eyeglass according to a first embodiment.

Referring to FIG. 1, an appearance diagram of an electronic eyeglass according to a first embodiment is shown. The electronic eyeglass 1 comprises a polarizing beam splitter (PBS) 11a, a PBS 11b, an eyeglass frame 12 and a micro-projector 13a. The eyeglass frame 12 carries the PBS 11a, the PBS 11b and the micro-projector 13a. The micro-projector 13a projects a polarized light L1 to the PBS 11a. When the polarization direction of the PBS 11a is perpendicular to the polarization direction of the polarized light L1, the polarized light L1 is reflected to the user's eyes. Of the lights of external real image, the polarized light whose polarization direction is identical to that of the PBSs 11a and 11b can be transmitted to the user's eyes through the PBSs 11a and 11b. Thus, the user can see both a virtual image projected by the micro-projector 13a and a real image of an external environment.

Second Embodiment

Figure 2:
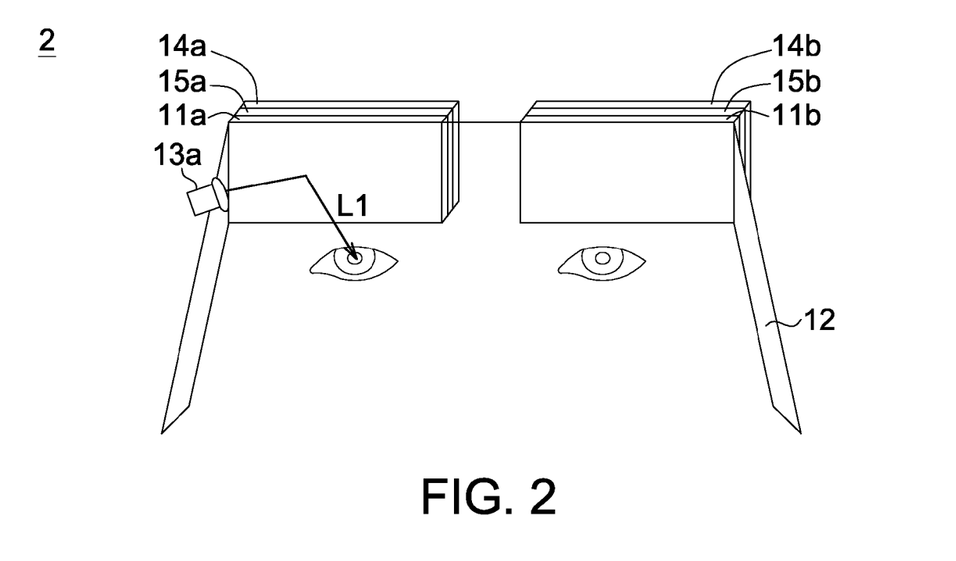
FIG. 2 is an appearance diagram of an electronic eyeglass according to a second embodiment.
Figure 3:
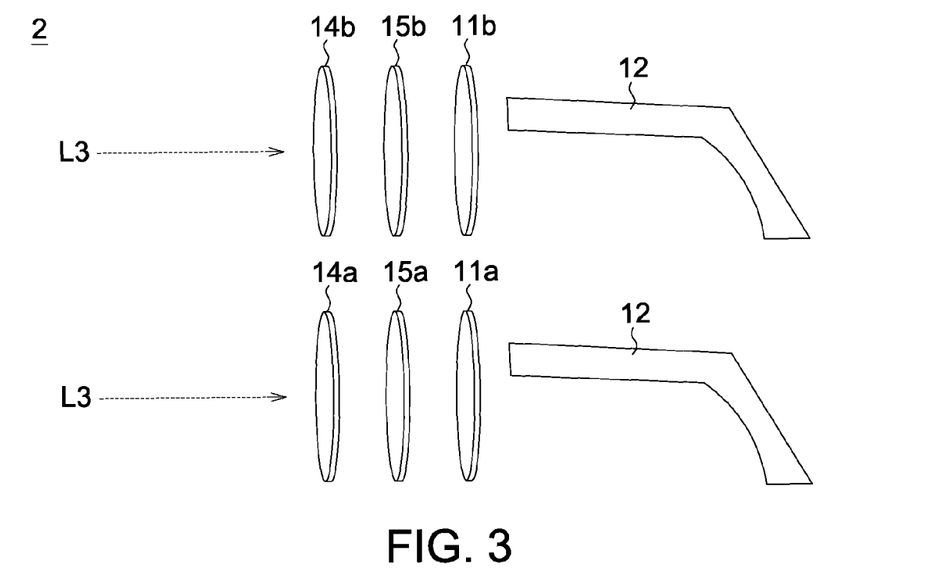
FIG. 3 is a partial diagram of an electronic eyeglass according to a second embodiment.
Figure 4:
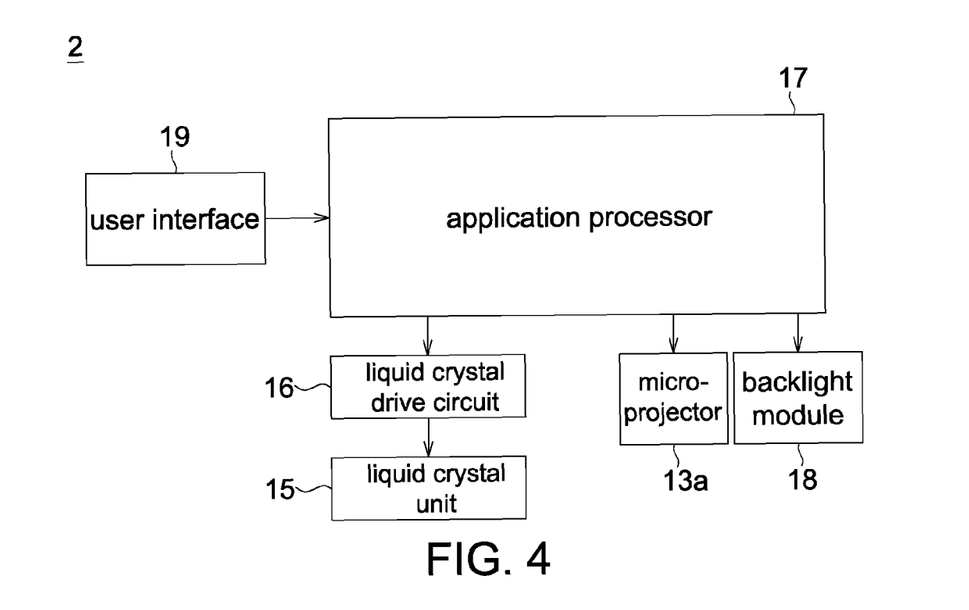
FIG. 4 is a circuit diagram of an electronic eyeglass according to a second embodiment.

Refer to FIG. 2, FIG. 3 and FIG. 4. FIG. 2 is an appearance diagram of an electronic eyeglass according to a second embodiment. FIG. 3 is a partial diagram of an electronic eyeglass according to a second embodiment. FIG. 4 is a circuit diagram of an electronic eyeglass according to a second embodiment. The second embodiment is different from the first embodiment mainly in that the electronic eyeglass 2 further comprises a polarization structure 14a, a polarization structure 14b, a liquid crystal unit 15, a liquid crystal drive circuit 16, an application processor 17, a backlight module 18 and a user interface 19, wherein the liquid crystal unit 15 comprises a liquid crystal plate 15a and a liquid crystal plate 15b. The liquid crystal drive circuit 16, for example, comprises a source driver and a gate driver. The backlight module 18 provides required backlight to the micro-projector 13a. The user interface 19 can be realized by such as a touch panel or a press key. The user can input an adjust signal through the user interface 19. The application processor 17 controls the liquid crystal drive circuit 16 to drive the liquid crystal plates 15a and 15b to adjust light transmittance ratio of the liquid crystal plates 15a and 15b according to the adjust signal.

The polarization structures 14a and 14b can both be realized by a polarizer or a PBS. If the polarization structures 14a and 14b both are a polarizer, the polarization structures 14a and 14b can absorb the light whose polarization direction is different from that of the polarization structures 14a and 14b to avoid the real image light L3 being reflected. The liquid crystal plate 15a is disposed between the PBS 11a and the polarization structure 14a, and the liquid crystal plate 15b is disposed between the PBS 11b and polarization structure 14b. The micro-projector 13a projects a polarized light L1 to the PBS 11a, which further reflects the polarized light L1 to the user's eyes. After the real image light L3 passes through the polarization structure 14a, only the polarized light whose polarization direction is parallel to the polarization structure 14a will be left and the polarization direction will be rotated by the crystal molecules of the liquid crystal plate 15a. Only the polarized light whose polarization direction is parallel to the PBS 11a can penetrate the PBS 11a and be transmitted to the user's eyes.

The user can set the electronic eyeglass 2 to be in an immersive mode, a see-through mode or an adaptive mode through the user interface 19. When the user sets the electronic eyeglass 2 to be in the immersive mode, the electronic eyeglass 2 completely isolates the user from external light such that the user is completely immersed in an environment provided by the electronic eyeglass 2 to enjoy the audio/video service provided by the electronic eyeglass 2. When the user sets the electronic eyeglass 2 to be in the see-through mode, the user wearing the electronic eyeglass 2 still is free to move around, and can see both the image of an external environment (real image) and the image projected by the micro-projector 13a (virtual image). When the user sets the electronic eyeglass 2 to be in the adaptive mode, the user can adjust the intensity of the real image light entering the user's eyes.

Figure 5:
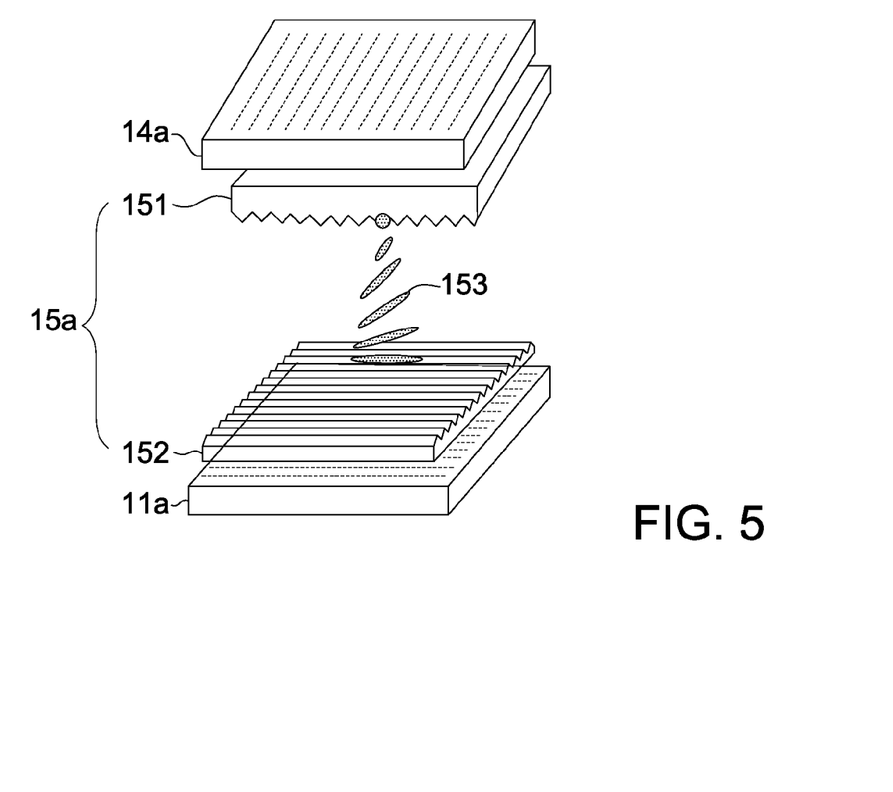
FIG. 5 is a schematic diagram of an electronic eyeglass being in a normally white state.
Figure 6:
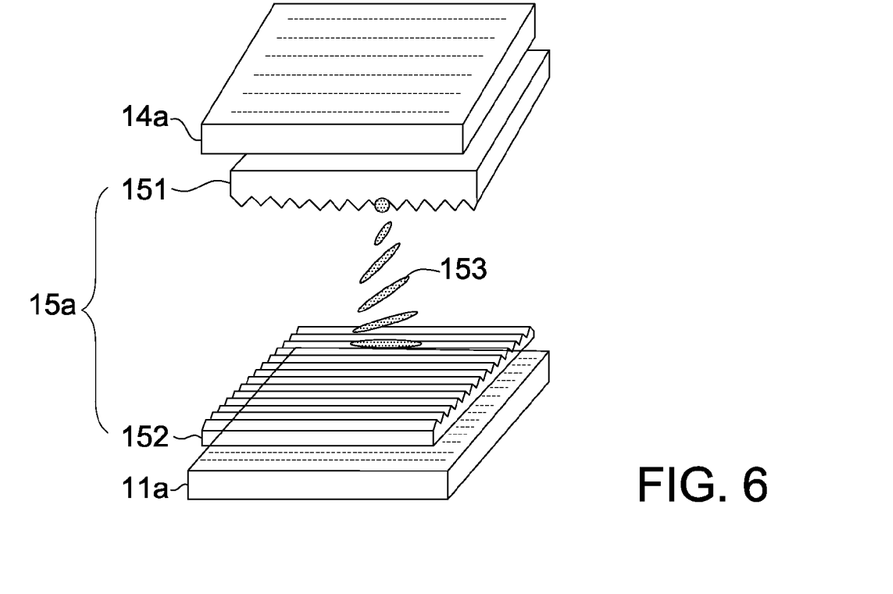
FIG. 6 is a schematic diagram of an electronic eyeglass being in a normally black state.

Refer to FIG. 5 and FIG. 6. FIG. 5 is a schematic diagram of an electronic eyeglass being in a normally white state. FIG. 6 is a schematic diagram of an electronic eyeglass being in a normally black state. The liquid crystal plate 15a further comprises an alignment film 151, an alignment film 152 and a plurality of liquid crystal molecules 153. The alignment films 151 and 152 both have grooves of nanometer (nm) level in which the liquid crystal molecules 153 can be embedded. When the alignment film 151 has a groove direction different from that of the alignment film 152 (such as being different by 90 degrees), the liquid crystal molecules between the alignment films 151 and 152, due to the characteristics of crystalline, will be forced to rotate according to the boundary conditions at the top and the bottom.

When the polarization direction of the polarization structure 14a is perpendicular to the polarization direction of the PBS 11a (as indicated in FIG. 5) and no electric field is applied to the liquid crystal plates, the liquid crystal molecules 153 rotate the polarization direction of the incoming light by 90 degrees such that the incoming light penetrates the PBS 11a and the electronic sunglass is in a normally white state, wherein the incoming light refers to the light entering the liquid crystal molecules 153 from the polarization structure 14a. Conversely, when the polarization direction of the polarization structure 14a is parallel to the polarization direction of the PBS 11a (as indicated in FIG. 6) and no electric field is applied to the liquid crystal plates, the liquid crystal molecules 153 rotate the polarization direction of the incoming light by 90 degrees such that the incoming light is blocked by the PBS 11a and the electronic sunglass is in a normally black state, wherein the incoming light refers to the light entering the liquid crystal molecules 153 from the polarization structure 14a.

When no electric field is applied to the liquid crystal plates, the real image light can penetrate the normally white liquid crystal plate. Based on the consideration of power saving, the normally white liquid crystal plate is more suitable to the see-through type head mounted display device. Conversely, when no electric field is applied to the liquid crystal plates, the real image light cannot penetrate the normally black liquid crystal plate. Based on the consideration of power saving, the normally black liquid crystal plate is more suitable to the immersive type head mounted display device.

Third Embodiment

Figure 7:
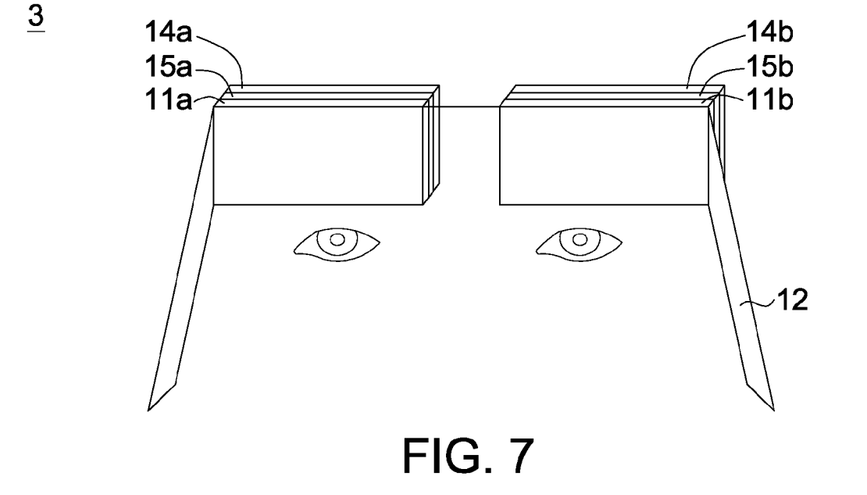
FIG. 7 is an appearance diagram of an electronic eyeglass according to a third embodiment.

Referring to FIG. 7, an appearance diagram of an electronic eyeglass according to a third embodiment is shown. The third embodiment is different from the second embodiment mainly in that the electronic eyeglass 3 comprises a polarizing beam splitter (PBS) 11a, a PBS 11b, an eyeglass frame 12, a polarization structure 14a, a liquid crystal plate 15a, a polarization structure 14b and a liquid crystal plate 15b, but does not comprise any micro-projectors. The electronic eyeglass 3 can be used as an electronic sunglass and is capable of dynamically adjusting the brightness of the real image light.

Fourth Embodiment

Figure 8:
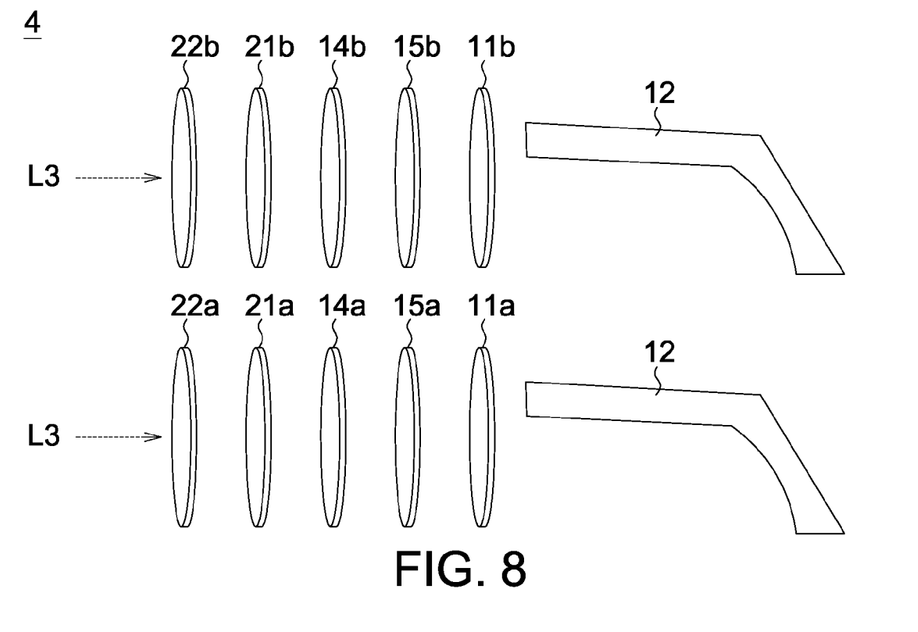
FIG. 8 is a partial diagram of an electronic eyeglass according to a fourth embodiment.

Referring to FIG. 8, a partial diagram of an electronic eyeglass according to a fourth embodiment is shown. The fourth embodiment is different from the second embodiment mainly in that the electronic eyeglass 4 further comprises an anti-reflection layer 22a, an anti-reflection layer 22b, a UV protection layer 21a and a UV protection layer 21b. The UV protection layer 21a is disposed between polarization structure 14a and anti-reflection layer 22a, while the UV protection layer 21b is disposed between the polarization structure 14b and the anti-reflection layer 22b.

Fifth Embodiment

Figure 9:
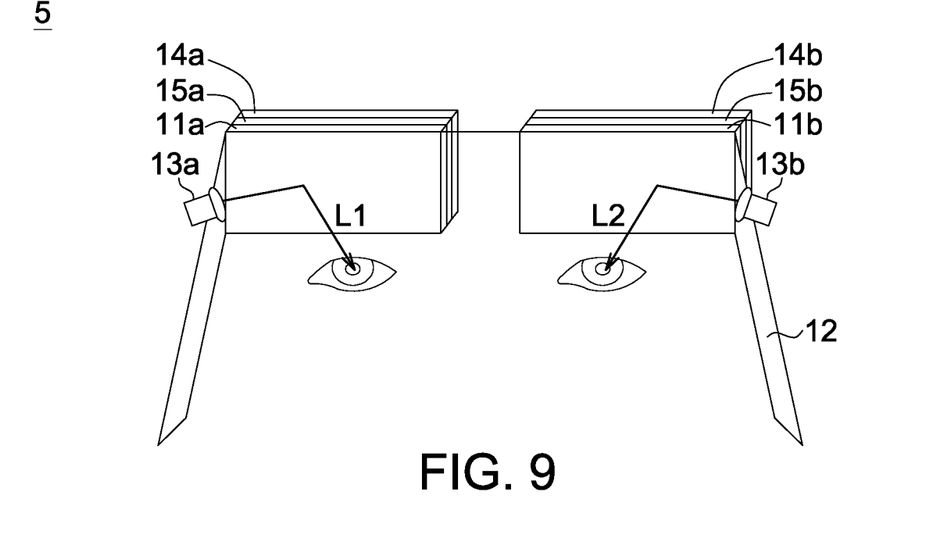
FIG. 9 is a partial diagram of an electronic eyeglass according to a fifth embodiment.

Referring to FIG. 9, a partial diagram of an electronic eyeglass according to a fifth embodiment is shown. The fifth embodiment is different from the second embodiment mainly in that the electronic eyeglass 5 further comprises a micro-projector 13b which projects a polarized light L2 to the PBS 11b. The polarization direction of the PBS 11b is perpendicular to the polarization direction of the polarized light L2, such that the polarized light L2 is reflected to the user's eyes. After the real image light passes through the polarization structure 14b, only the polarized light whose polarization direction is parallel to the polarization structure 14b will be left, and will be rotated by the crystal molecules of the liquid crystal plate 15b. Only the polarized light whose polarization direction is parallel to the PBS 11b can penetrate the PBS 11b and be transmitted to the user's eyes.

Sixth Embodiment

Figure 10:
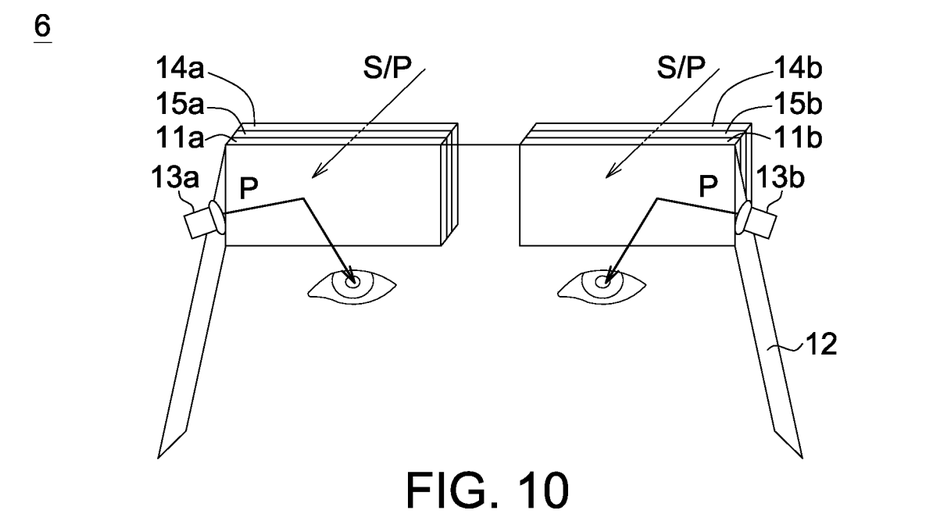
FIG. 10 is an appearance diagram of an electronic eyeglass according to a sixth embodiment.
Figure 11:
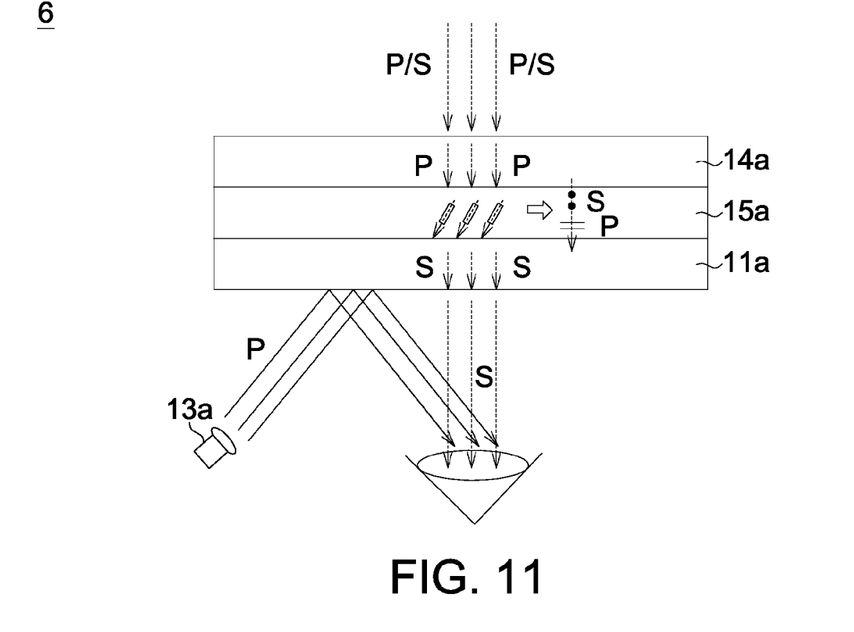
FIG. 11 is a partial diagram of an electronic eyeglass according to a sixth embodiment.
Figure 12:
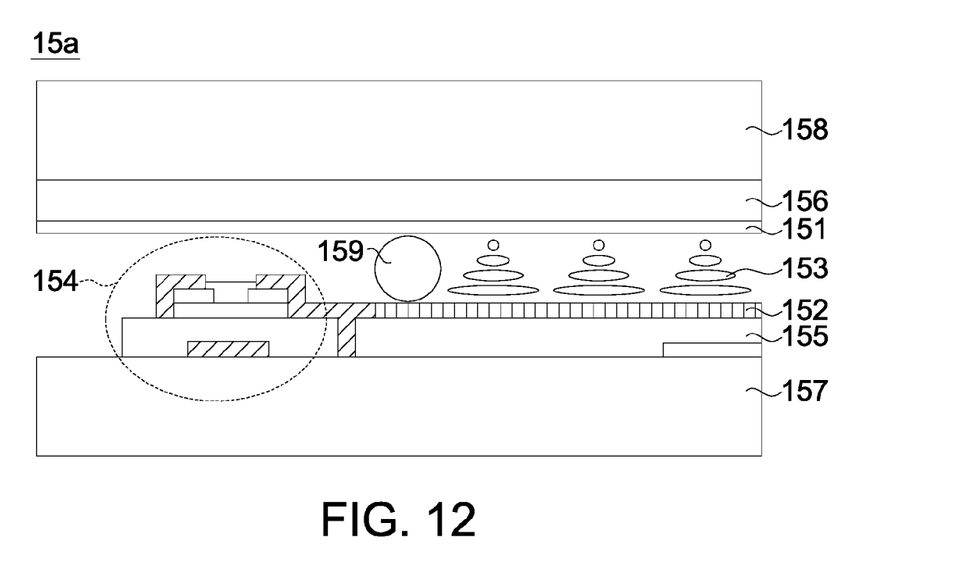
FIG. 12 is a structural diagram of a liquid crystal plate.

Refer to FIG. 10, FIG. 11 and FIG. 12. FIG. 10 is an appearance diagram of an electronic eyeglass according to a sixth embodiment. FIG. 11 is a partial diagram of an electronic eyeglass according to a sixth embodiment. FIG. 12 is a structural diagram of a liquid crystal plate. The polarization structures 14a and 14b of the electronic eyeglass 6 both have a horizontal polarization direction. The polarized lights P projected by the micro-projectors 13a and 13b both have a horizontal polarization direction. The PBSs 11a and 11b both have a vertical polarization direction.

Since the PBSs 11a and 11b both have a vertical polarization direction and the polarized lights P projected by the micro-projectors 13a and 13b both have a horizontal polarization direction, the polarized lights P projected by the micro-projectors 13a and 13b are reflected to the user's eyes through the PBSs 11a and 11b respectively. After the polarized lights P of a real image light pass through the polarization structures 14a and 14b respectively, the polarized lights P are rotated by the liquid crystal plates 15a and 15b as polarized lights S, which are then reflected to the user's eyes through the PBSs 11a and 11b respectively. Therefore, when no electric field is applied to the liquid crystal plates 15a and 15b, the electronic eyeglass 6 will be in a normally white state.

The structure of the liquid crystal plate 15b is identical to that of the liquid crystal plate 15a. For convenience of illustration, FIG. 12 is exemplified by the liquid crystal plate 15a. The liquid crystal plate 15a further comprises a thin-film transistor 154, a pixel electrode 155, a common electrode 156, a glass substrate 157, a glass substrate 158 and a spacer 159 in addition to the alignment film 151, the alignment film 152 and the liquid crystal molecules 153. The spacer 159 is disposed between the alignment films 151 and 152. The pixel electrode 155 is disposed under the alignment film 152, and the glass substrate 157 is disposed under the pixel electrode 155. The common electrode 156 is disposed on the alignment film 151, and the glass substrate 158 is disposed on the common electrode 156.

After the thin-film transistor 154 is conducted, the voltage difference between the pixel electrode 155 and the common electrode 156 generates an external electric field, which causes the liquid crystal molecules 153 to rotate. The polarization direction of the polarized light P passing through the liquid crystal molecules 153 will also be rotated into two different components, namely, the polarized light P and the polarized light S (as indicated in FIG. 11) but only the polarized light S can penetrate the PBSs 11a and 11b having a vertical polarization direction and reach the user's eyes. Thus, through the control of the voltage of the pixel electrode 155, the rotation of the liquid crystal molecules 153 can be controlled, and the component of the polarized light S penetrating the PBSs 11a and 11b can also be controlled. Thus, the brightness ratio of the external real image light entering the user's eyes can be controlled.

Current display technology is capable of controlling 256 gray levels by using 8 bits. In terms of the control of the liquid crystal plate 15a, the brightness of incoming light coming from the exterior is divided into 256 levels, and the brightness of outgoing light is controlled according to system requirements. When external light is completely blocked, the gray level is 0, and the electronic eyeglass is in an immersive mode. Relatively, when the external light completely penetrates the liquid crystal plate, the gray level is 256, and the electronic eyeglass is in a see-through mode. When the electronic eyeglass of FIG. 10 is in a normally white state, the liquid crystal plate 15a can enter the see-through mode even when no power is supplied. When the gray level is between 1~254, the electronic eyeglass is in an adaptive mode. After the electronic eyeglass enters the adaptive mode, the incoming light of the electronic eyeglass is modulated as a regulated light which is further transmitted to the user's eyes. The relationship between the incoming light, the outgoing light, the gray level and the number of bits are expressed as:

$$\frac{\text{intensity of incoming light}}{\text{intensity of outgoing light}} = \frac{1}{2} \times \frac{\text{gray level}}{2^N - 1},$$

wherein, N represents the number of bits of gray levels. It is shown in above disclosure that the electronic eyeglass 6 will be in a normally white state when no electric field is applied to the liquid crystal plates 15a and 15b.

Seventh Embodiment

Figure 13:
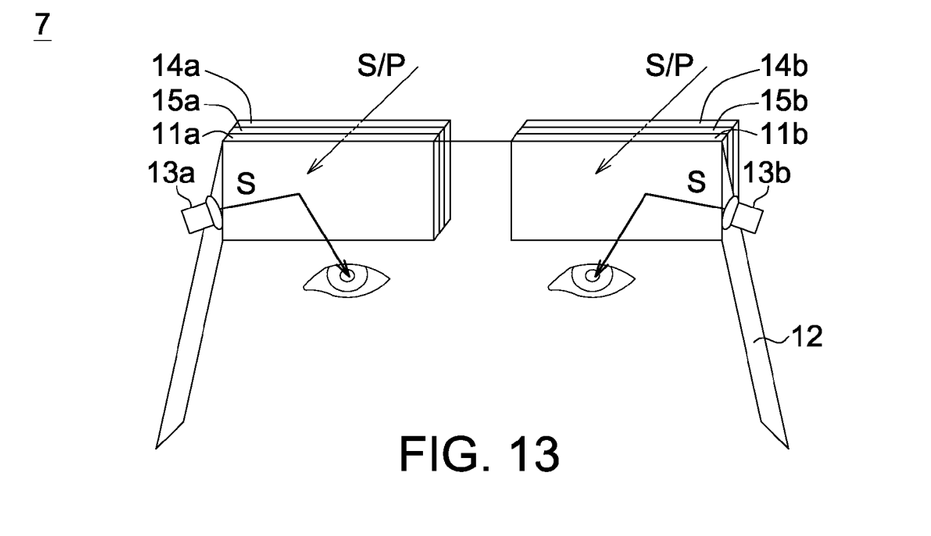
FIG. 13 is an appearance diagram of an electronic eyeglass according to a seventh embodiment.

Referring to FIG. 13, an appearance diagram of an electronic eyeglass according to a seventh embodiment is shown. The polarization structures 14a and 14b of the electronic eyeglass 7 both have a vertical polarization direction. The polarized lights S projected by the micro-projectors 13a and 13b both have a vertical polarization direction. The PBSs 11a and 11b have a horizontal polarization direction.

Since the PBSs 11a and 11b both have a horizontal polarization direction and the polarized lights S projected by the micro-projectors 13a and 13b both have a vertical polarization direction, the polarized lights S are reflected to the user's eyes through the PBSs 11a and 11b respectively. After the polarized lights S of a real image light pass through the polarization structures 14a and 14b respectively, the liquid crystal plates 15a and 15b rotate the polarized lights S as polarized lights P which are further transmitted to the user's eyes through the PBSs 11a and 11b. Therefore, the electronic eyeglass 7 will be in a normally white state when no electric field is applied to the liquid crystal plates 15a and 15b.

Eighth Embodiment

Figure 14:
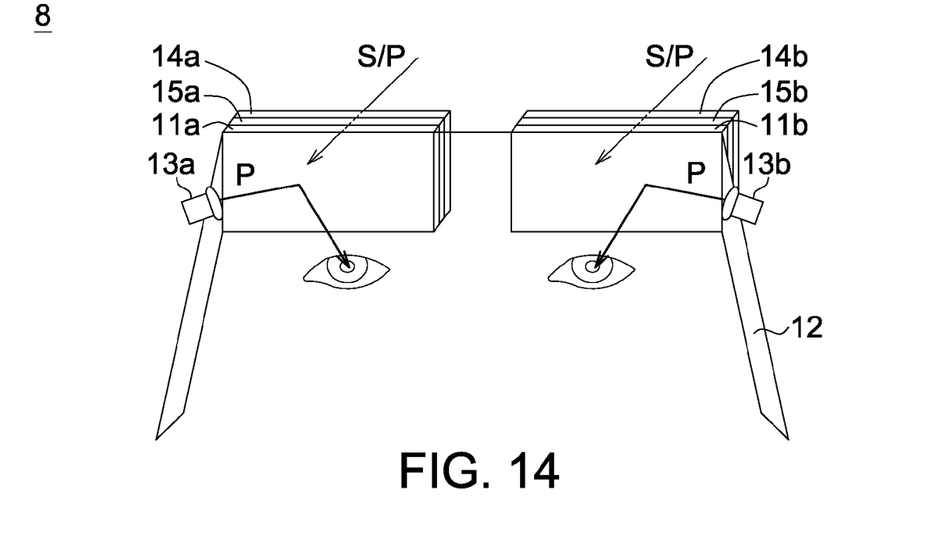
FIG. 14 is an appearance diagram of an electronic eyeglass according to an eighth embodiment.

Referring to FIG. 14, an appearance diagram of an electronic eyeglass according to an eighth embodiment is shown. The polarization structures 14a and 14b of the electronic eyeglass 8 both have a vertical polarization direction. The polarized lights P projected by the micro-projectors 13a and 13b both have a horizontal polarization direction. The PBSs 11a and 11b both have a vertical polarization direction.

Since the PBSs 11a and 11b both have a vertical polarization direction and the polarized lights P projected by the micro-projectors 13a and 13b both have a horizontal polarization direction, the polarized lights P are reflected to the user's eyes through the PBSs 11a and 11b respectively. After the polarized lights S of a real image light pass through the polarization structures 14a and 14b respectively, the liquid crystal plates 15a and 15b rotate the polarized lights S as polarized lights P which are blocked by the PBSs 11a and 11b. Therefore, the electronic eyeglass 8 will be in a normally black state when no electric field is applied to the liquid crystal plates 15a and 15b.

Ninth Embodiment

Figure 15:
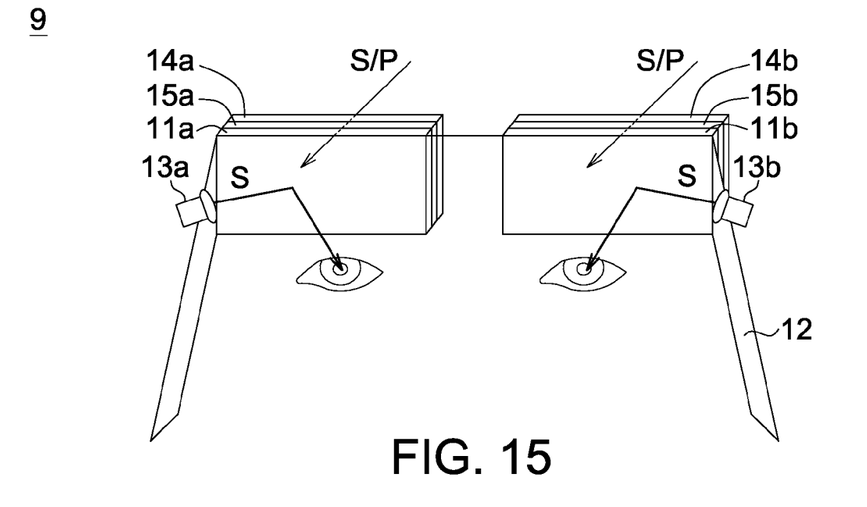
FIG. 15 is an appearance diagram of an electronic eyeglass according to a ninth embodiment.

Referring to FIG. 15, an appearance diagram of an electronic eyeglass according to a ninth embodiment is shown. The polarization structures 14a and 14b of the electronic eyeglass 9 both have a horizontal polarization direction. The polarized lights S projected by the micro-projectors 13a and 13b both have a vertical polarization direction. The PBSs 11a and 11b both have a horizontal polarization direction. Since the PBSs 11a and 11b have a horizontal polarization direction and the polarized lights S projected by the micro-projectors 13a and 13b both have a vertical polarization direction, the polarized lights S are reflected to the user's eyes through the PBSs 11a and 11b respectively. After the polarized lights P of a real image light pass through the polarization structures 14a and 14b respectively, the liquid crystal plates 15a and 15b rotate the polarized lights S as polarized lights P which are blocked by the PBSs 11a and 11b. Therefore, the electronic eyeglass 9 will be in a normally black state when no electric field is applied to the liquid crystal plates 15a and 15b.

Tenth Embodiment

Figure 16:
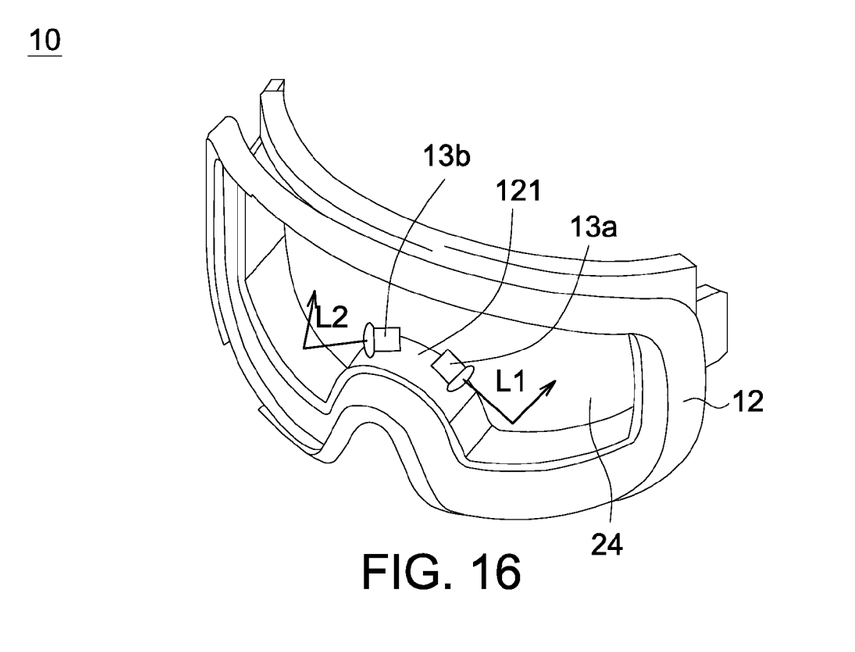
FIG. 16 is an appearance diagram of an electronic eyeglass according to a tenth embodiment.

Referring to FIG. 16, an appearance diagram of an electronic eyeglass according to a tenth embodiment is shown. The tenth embodiment is different from the fifth embodiment mainly in that the electronic eyeglass 10 can be designed as skiing goggles. The eyeglass frame 12 of the electronic eyeglass 10 comprises a nose-pad structure 121 mounted on the bridge of the user's nose. The micro-projectors 13a and 13b are respectively disposed at two sides of the nose-pad structure 121. The lens 24 of the electronic eyeglass 10 comprises a polarization structure, a liquid crystal plate and a PBS. The micro-projector 13a projects a polarized light L1, and the micro-projector 13b projects a polarized light L2. The polarization direction of the PBS is perpendicular to the polarization direction of the polarized lights L1 and L2, such that the polarized lights L1 and L2 are reflected to the user's eyes.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic eyeglass, comprising:
a first polarizing beam splitter; and
a first polarization structure;
a first liquid crystal plate disposed between the first polarizing beam splitter and the first polarization structure;
an eyeglass frame for carrying the first polarizing beam splitter; and
a first micro-projector for providing a first polarized light to the first polarizing beam splitter, wherein the polarization direction of the first polarizing beam splitter is perpendicular to the polarization direction of the first polarized light projected from the first micro-projector to the first polarizing beam splitter, such that the first polarized light is reflected,
wherein the first polarization structure is a polarizing beam splitter,
and wherein the electronic eye glass further comprises a nose-pad structure mounted on the bridge of the user's nose,
whereby the micro-projector is disposed at a side of the nose-pad structure.

2. The electronic eyeglass according to claim 1, further comprising:

a first anti-reflection layer; and
a first UV protection layer disposed between the first polarization structure and the first anti-reflection layer.

3. The electronic eyeglass according to claim 1, further comprising:
a liquid crystal drive circuit; and
an application processor for controlling the liquid crystal drive circuit to drive the first liquid crystal plate.

4. The electronic eyeglass according to claim 3, further comprising:
a user interface for inputting an adjust signal, wherein the application processor controls the liquid crystal drive circuit to drive the first liquid crystal plate to adjust light transmittance of the first liquid crystal plate according to the adjust signal.

5. The electronic eyeglass according to claim 1, wherein the first polarization structure and the first polarized light both have a horizontal polarization direction, and the first polarizing beam splitter has a vertical polarization direction.

6. The electronic eyeglass according to claim 1, wherein the first polarization structure and the first polarized light both have a vertical polarization direction, and the first polarizing beam splitter has a horizontal polarization direction.

7. The electronic eyeglass according to claim 1, wherein the first polarization structure and the first polarizing beam splitter both have a vertical polarization direction, and the first polarized light has a horizontal polarization direction.

8. The electronic eyeglass according to claim 1, wherein the first polarization structure and the first polarizing beam splitter both have a horizontal polarization direction, and the first polarized light has a vertical polarization direction.

9. The electronic eyeglass according to claim 1, further comprising:
a second polarizing beam splitter carried by the eyeglass frame.

10. The electronic eyeglass according to claim 9, further comprising:
a second polarization structure; and
a second liquid crystal plate disposed between the second polarizing beam splitter and the second polarization structure.

11. The electronic eyeglass according to claim 10, further comprising:
a second anti-reflection layer; and
a second UV protection layer disposed between the second polarization structure and the second anti-reflection layer.

12. The electronic eyeglass according to claim 10, wherein the second polarization structure is a polarizer.

13. The electronic eyeglass according to claim 10, wherein the second polarization structure is a polarizing beam splitter.

14. The electronic eyeglass according to claim 10, further comprising:
a liquid crystal drive circuit; and
an application processor for controlling the liquid crystal drive circuit to drive the second liquid crystal plate.

15. The electronic eyeglass according to claim 14, further comprising:
a user interface for inputting an adjust signal, wherein the application processor controls the liquid crystal drive circuit to drive the second liquid crystal plate to adjust light transmittance of the second liquid crystal plate according to the adjust signal.

16. The electronic eyeglass according to claim 10, further comprising:

a second micro-projector for providing a second polarized light to the second polarizing beam splitter, wherein the polarization direction of the second polarizing beam splitter is perpendicular to the polarization direction of the second polarized light, such that the second polarized light is reflected.

17. The electronic eyeglass according to claim 16, wherein the second polarization structure and the second polarized light both have a horizontal polarization direction, and the second polarizing beam splitter has a vertical polarization direction.

18. The electronic eyeglass according to claim 16, wherein the second polarization structure and the second polarized light both have a vertical polarization direction, and the second polarizing beam splitter has a horizontal polarization direction.

19. The electronic eyeglass according to claim 16, wherein the second polarization structure and the second polarizing beam splitter both have a vertical polarization direction, and the second polarized light has a horizontal polarization direction.

20. The electronic eyeglass according to claim 16, wherein the second polarization structure and the second polarizing beam splitter both have a horizontal polarization direction, and the second polarized light has a vertical polarization direction.

\* \* \* \* \*